(No Model.)
P. H. WHEELER.
WATCH REGULATOR.
No. 354,283.          Patented Dec. 14, 1886.
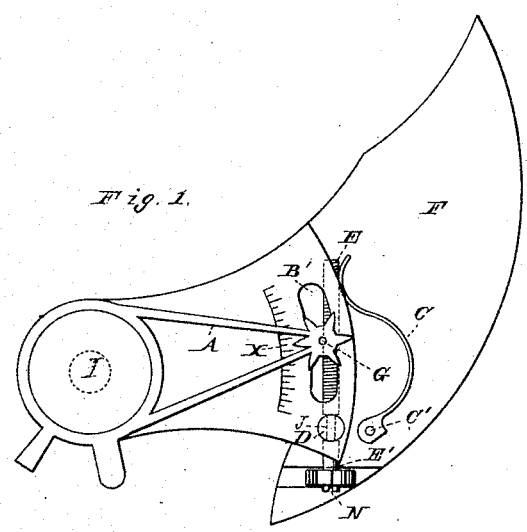
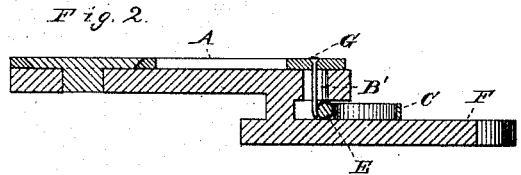
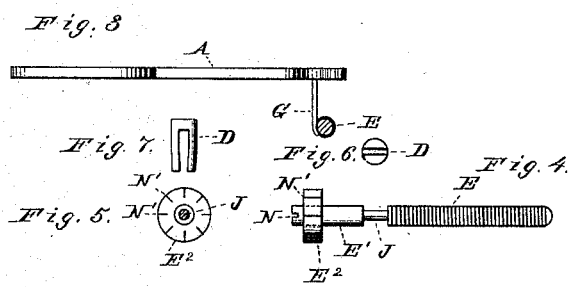
WITNESSES          INVENTOR
Villette Anderson.        Philip H. Wheeler
         by
           ATTORNEYS

UNITED STATES PATENT OFFICE.

PHILIP H. WHEELER, OF COLUMBUS, OHIO, ASSIGNOR TO THE COLUMBUS WATCH COMPANY, OF SAME PLACE.

WATCH-REGULATOR.

SPECIFICATION forming part of Letters Patent No. 354,283, dated December 14, 1886.

Application filed June 3, 1886. Serial No. 204,051. (No model.)

*To all whom it may concern:*

Be it known that I, PHILIP H. WHEELER, a citizen of the United States, residing at Columbus, in the county of Franklin and State of Ohio, have invented certain new and useful Improvements in Watch-Regulators; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a top view. Fig. 2 is a vertical section. Figs. 3, 4, 5, 6, and 7 are detail views.

My invention relates to watch-regulators; and it consists in the construction and novel combination of parts, as hereinafter described, and pointed out in the claims.

Referring by letter to the accompanying drawings, F designates the balance-bridge commonly used on watches, and having an arc-slot, B', in which the pin G moves.

A designates the regulator-arm, which is provided near its outer end with the downwardly-projecting pin G, said pin being curved near its lower end, to provide suitable engagement with the threads of the straight screw E. This screw E is provided with a plain portion, E', for a part of its length, at one end, of the same diameter as the threaded portion E, and between the threaded and plain portions said screw E is provided with a reduced journal portion, J. A curved spring, C, is secured by a pin, C', usually upon the face of the balance-bridge F, and the free end of this curved spring C bears against the threaded portion of the screw E, at the inner end of said screw. The outer end of the screw E has a nick, N, or seat for a screw-driver, and near this seat N and secured upon the plain portion E' of the screw is a circular flange, E², having transverse peripheral nicks N' for the point, tool, or screw-driver, by which the screw E is to be turned, when necessary. These nicks or seats are for minute adjustments. The tension-spring C keeps the screw E in frictional contact with the pin G. The screw E rests in a balance-recess of the balance-bridge, and is therefore not exposed to view when the watch-movement is put together.

D designates the socket or bearing, which is bifurcated and slightly closed at the point, so as to snap over the reduced portion J of the screw E, thereby holding itself and the screw E in position and permitting the screw to swivel on the socket D, as it changes its angular position while moving the regulator either right or left on the center-post I.

The construction and combination of devices as above described admit of no backlash, and the regulator will at once move either way by turning the screw E in the proper direction, however slightly said screw may be moved, thereby securing a most accurate regulation of the watch-movement.

X designates the scale to gage the distance the regulator is moved.

Having described this invention, what I claim, and desire to secure by Letters Patent, is—

1. In a watch-regulator, the combination, with the regulator-arm having the downwardly-projecting curved pin, of the straight screw having the journal portion, the swivel-socket embracing the journal portion of the screw, and the curved spring bearing against the threaded portion of said screw, to hold the screw in engagement with the downwardly-projecting pin, substantially as specified.

2. The combination, in a watch-regulator, with the slotted and recessed balance-bridge and the regulator provided with the downwardly-projecting pin, of the screw having the journal portion and nicked flange, the bifurcated swivel-socket, and the curved spring bearing against the screw, substantially as specified.

In testimony whereof I affix my signature in presence of two witnesses.

PHILIP H. WHEELER.

Witnesses:
GEO. V. NEAL,
WALTER W. OWEN.